(12) United States Patent
Roger et al.

(10) Patent No.: US 7,673,441 B2
(45) Date of Patent: Mar. 9, 2010

(54) SLIDER CHAINS

(75) Inventors: Antony Roger, Sartrouville (FR);
Michel Barreaux, Henonville (FR)

(73) Assignee: S2F Flexico, Henonville (FR)

( * ) Notice: Subject to any disclaimer, the term of this patent is extended or adjusted under 35 U.S.C. 154(b) by 0 days.

(21) Appl. No.: 12/214,674

(22) Filed: Jun. 19, 2008

(65) Prior Publication Data

US 2009/0031694 A1 Feb. 5, 2009

(30) Foreign Application Priority Data

Jun. 21, 2007 (FR) .................................. 07 55918

(51) Int. Cl.
*F16G 15/12* (2006.01)
*A44C 5/02* (2006.01)
(52) U.S. Cl. ................ 59/85; 59/79.1; 59/80; 59/93; 59/900; 24/415

(58) Field of Classification Search ............... 59/79.1, 59/80, 85, 93, 900; 24/415
See application file for complete search history.

(56) References Cited

U.S. PATENT DOCUMENTS

| 2,791,868 | A | * | 5/1957 | Viken | 59/80 |
| 3,845,618 | A | * | 11/1974 | Meyerson | 59/80 |
| 4,770,008 | A | * | 9/1988 | Yamaura | 59/900 |
| 6,782,690 | B2 | * | 8/2004 | Kwan | 59/79.1 |

* cited by examiner

*Primary Examiner*—David B Jones
(74) *Attorney, Agent, or Firm*—Blakely, Sokoloff, Taylor & Zafman (57) ABSTRACT

A slider chain including a plurality of sliders joined together by divisible bridging pieces (30), and including a linking device at each end in order to interconnect the ends of two slider chains so as to form a longer chain overall. The sliders include an attachment mechanism which is not of cylindrical revolution.

9 Claims, 4 Drawing Sheets

FIG_3

SLIDER CHAINS

The invention relates to the field of slider chains that are intended to be mounted on closure assemblies, for bags for example, and most particularly the linking tabs designed to interconnect slider chains two by two in order to form a longer overall slider chains, for industrial applications.

In a manner that is known, such slider chains are composed of a plurality of sliders joined together by divisible bridging pieces. However, being made by moulding in plastic materials, the chains can generally have only a few tens of sliders at most, since the technique of moulding by injection does not, of itself, allow the manufacture of longer chains in a continuous process.

With a view to industrial applications, it was therefore necessary to find a way to connect slider chains to each other in a sufficiently flexible manner to be able to use the slider chains thus created in automatic slider fitting machines.

Figure 1A:
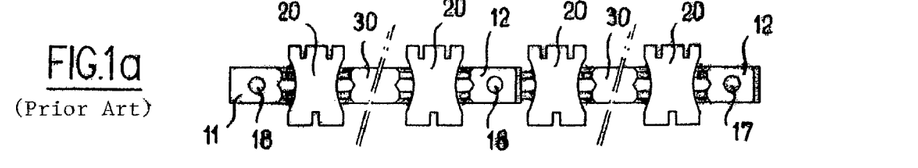
FIGS. 1a and 1b show, in plan view and in elevation, two slider chains, each including several sliders, that are connected together at their ends by linking tabs according to the prior art.
Figure 1B:
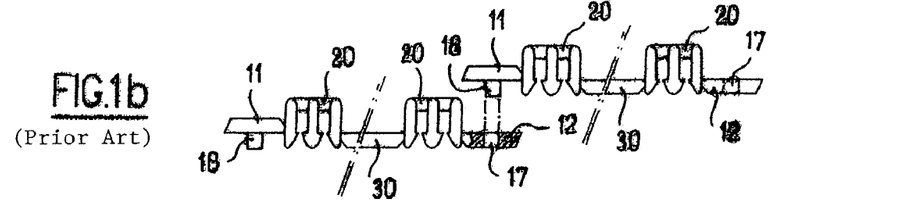

For example, French patent 70 02667 describes slider chains created by injection moulding, and designed so as to be joined together at their ends by linking tabs, 11 and 12, as illustrated in FIGS. 1a and 1b appended. The linking tabs 11 and 12 respectively have a stud 18 and an orifice 17. By mutually interlocking these, they form an attachment point between two consecutive chains. In this way, it is possible to create a longer chain overall.

However, this interconnection method has the drawback of not preventing the relative movements in rotation of the chains about their attachment point. Now the relative pivoting of the chains during their passage to a slider fitting device, can impede, prevent or even render defective the fitting of the cursors automatically. This therefore unavoidably involves momentary stopping of the fitting device (or even of the overall machine including the fitting device), or at least a slowing of the production rate, so that straightening of the chains can be effected.

Such operations unavoidably increase the production cost of the final products.

In addition, the linking tabs, once assembled, are about twice as thick as the divisible bridging pieces within a chain, and in particular, this additional thickness can give rise to problems during the passage of the chains in the slider fitting devices.

An objective of the invention is to propose a new linking device to interconnect the ends of two slider chains, so as to be able to consecutively assemble several slider chains to form a longer slider chain.

Another objective of the invention is to propose a linking device to interconnect the ends of two slider chains, preventing relative movements in rotation of the said chains.

Another objective of the invention is to propose a linking device to interconnect the ends of two slider chains created by moulding.

Another objective of the invention is to propose a linking device to interconnect the ends of two slider chains whose overall thickness is substantially the same as the thickness of the divisible bridging pieces within the chains.

Another objective of the invention is to propose a linking device to interconnect the ends of two slider chains created by injection moulding.

Finally, an objective of the invention is to propose a set of slider chains, including several slider chains whose ends are interconnected by means of a linking device, whose use in a slider fitting device automatically gives rise to fewer problems than the conventional chains.

To this end, the invention proposes a slider chain including a plurality of sliders joined together by divisible bridging pieces, and including a linking device at each end to interconnect the ends of two slider chains so as to form a longer chain overall, characterised in that the linking devices include attachment means which are not of cylindrical revolution.

According to a second aspect, the invention also proposes an assembly including a plurality of slider chains that are connected together by means of a linking device according to the invention with attachment means which are not of cylindrical revolution.

The invention will be understood more clearly on reading the detailed description that follows, given with reference to the appended drawings, in which.

Figure 2:
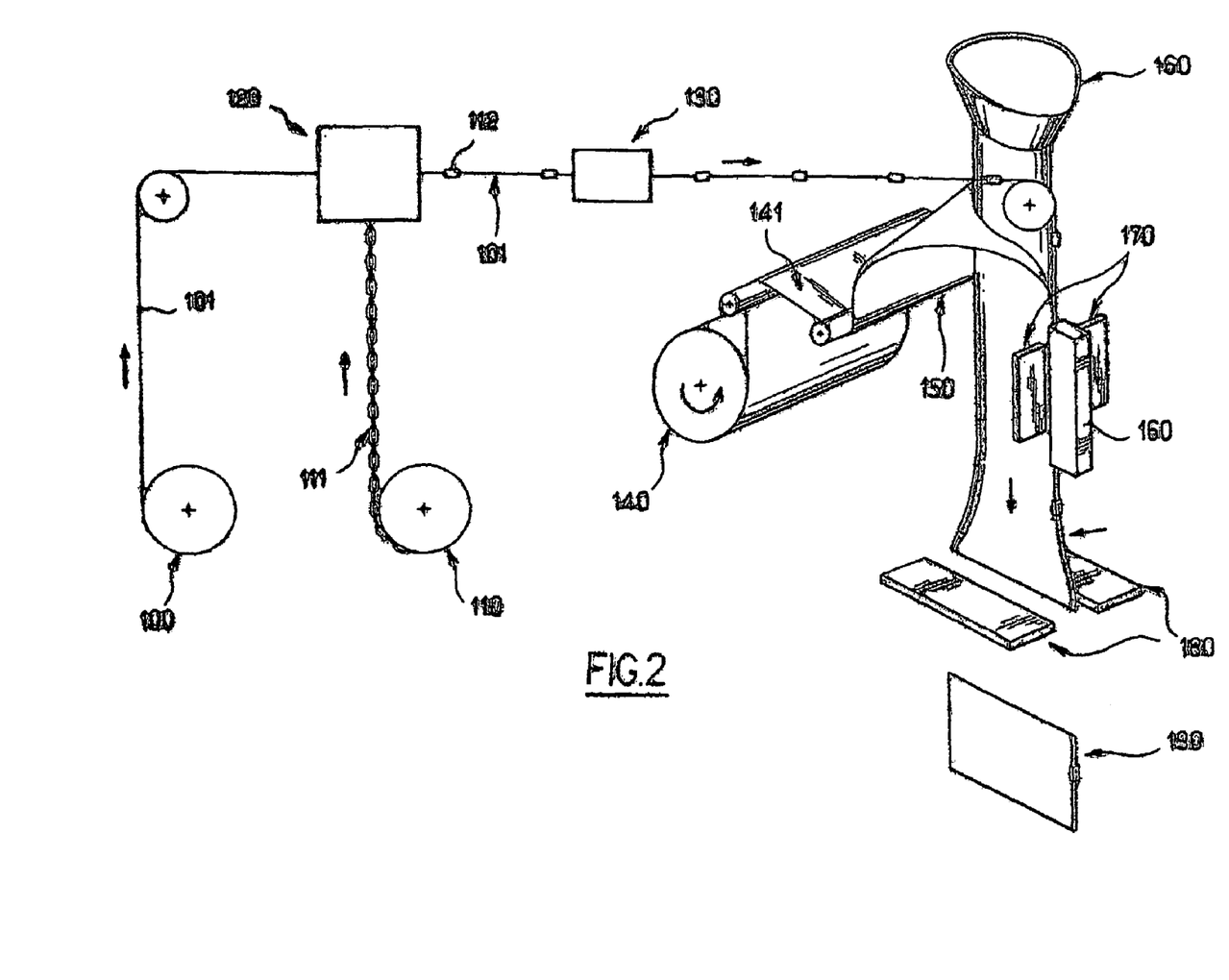
FIG. 2 is a schematic view in perspective of a machine for the manufacture of bags, suitable to use a linking device according to the present invention.

The invention applies in particular to the manufacture of bags, in particular but non-exclusively on an automatic machine for the manufacture, filling and closing of bags as illustrated in FIG. 2. Such a machine includes:

means 100 for the feeding of a strip of closure extrusions 101, means 110 for the feeding of slider chains 111 of sliders 112, a station 120 with a slider 112 fitting device, intended to sequentially effect the individual fitting of each slider 112 onto the said strip 101, a station 130 intended to perform closure of the strips 101, meaning mutual engagement of the two extrusions on the closure strip 101, after fitting of the sliders 112, means 140 for the feeding of a thermoplastic film 141, a shaping neck 150, associated with a filling channel 160, which shapes the film 141 from an initial flat condition into a tube, a positioner 160 of the closure strip 101 in relation to the adjacent longitudinal edges of the film 141, associated with longitudinal welding jaws 170, transverse welding jaws 180 associated with cutting means.

FIG. 2 attached illustrates such a machine, in which the closure strip 101 is fitted longitudinally onto the edges of the film 141, meaning parallel to the direction of movement of the film 141. In a variant, the closure strip 101 can be placed transversally on the film 141, meaning substantially perpendicular to the direction of movement of the film 141.

The invention applies to all types of closure strip 101, in particular the closure strips with two complementary male and female extrusions, hooked extrusions, extrusions joined together by a u-shaped linking strip to form an opening indicator, etc.

The invention also applies to the manufacture of empty bags 190 intended for later filling, or for the preparation of closure strips 101 that are pre-equipped with sliders, with a view to the later manufacture of bags 190 fitted with such closure strips 101.

In addition, the device 110 for the fitting of sliders 112 is design to fit the sliders 112 onto the closure strip extrusions 101, whatever the type of film shaping machine 141 used, and whether the welding takes place before or after the fitting of the sliders.

Thus, the invention relates to a slider chain, in particular but not exclusively for the manufacture of thermoplastic bags for multiple opening, with two strips of complementary closure extrusions.

A slider chain 111 generally includes a plurality of sliders 112, joined together by conventional divisible bridging pieces 30.

The divisible bridging pieces 30 are known to those skilled in the art, and will not be described further here.

Each chain 111 according to the invention carries a linking tab (or interconnection tab) 1, 2 at each of its ends. This tab 1, 2 is divisible, in the same way as the bridging pieces 30 within the said chain 111, so as to allow a device 120 for the fitting of sliders 112 to separate the end slider of a chain (and of the rest of the slider chains), and to fit it onto a closure strip 101.

The sliders 112, bridging pieces 30 and tabs 1, 2 are preferably made from POM (Polyoxymethylene) or polyolefins, such as high and low density polyethylene, polypropylene, etc.

In order that the interconnection created by the linking of two tabs 1 and 2 does not lead to a thickness greater than that of a divisible bridging piece 30 within the chain 111, the end tabs 1 and 2 are preferably half as thick as a bridging piece 30 within the chain, or are configured in the form of complementary ribs and grooves see examples in FIGS. 4 to 8 attached. Thus, once assembled to interconnect two chains, their final thickness is the same as that of a bridging piece 30 in the said chains.

As illustrated in FIG. 3 and FIGS. 5 to 8, the linking tabs 1 and 2 can also be fitted with structures that prevent the relative transverse movement of two linking tabs when they are assembled together.

A large number of embodiments can be envisaged in the context of the present invention. Two non-limiting embodiments will now be described.

FIRST EMBODIMENT

According to a first embodiment, the fixing device to interconnect two chains is composed of a tab 1, located at the end of one of the chains, and a tab 2 located at the end of the other chain, where the said tabs 1 and 2 are of complementary shape.

Quite obviously, a slider chain according to the invention preferably includes, a linking tab of the tab 1 type at one of its ends, and a linking tab of the tab 2 type at the other end. Thus all the chains are identical. In a variant however, it is possible to provide for a first series of chains with a linking tab at each of its two ends of the tab 1, and a second series of chains with at each of its two ends a linking tab of the tab 2 type. According to yet another variant embodiment, the linking tabs can be totally symmetrical and hermaphroditic.

The tabs 1 and 2 include at least one attachment element, namely at least one projection and as many cavities. Each projection from one of the tabs 1, 2 is associated with a cavity that is complementary to it and formed in the other tab, so that they are located facing each other when the said tabs 1 and 2 are interconnected.

The means of attachment and fixation preferably do not have symmetry of revolution, so as to prevent relative rotation movement of the interconnected chains.

The cavities extend over all or part of the height of a tab, and their depth is at least equal to the height of the associated projection.

Figure 7:
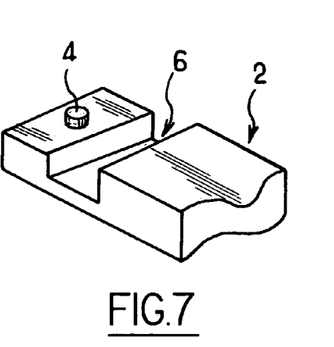
Figure 8A:
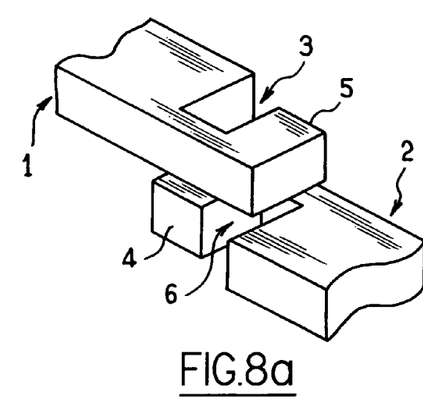
Figures 8A, 8B:
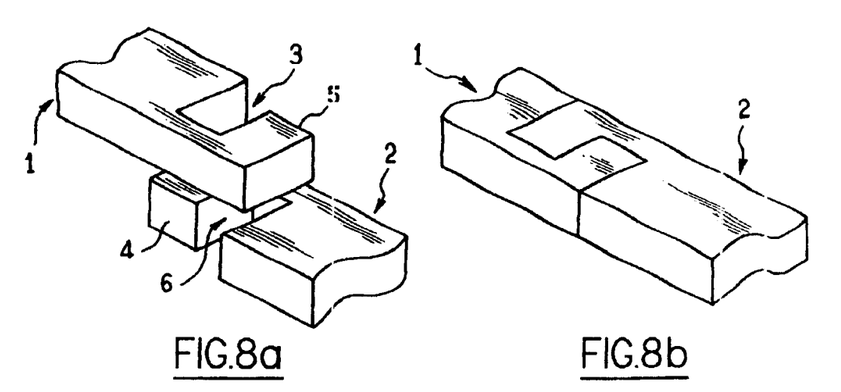
Figure 8B:
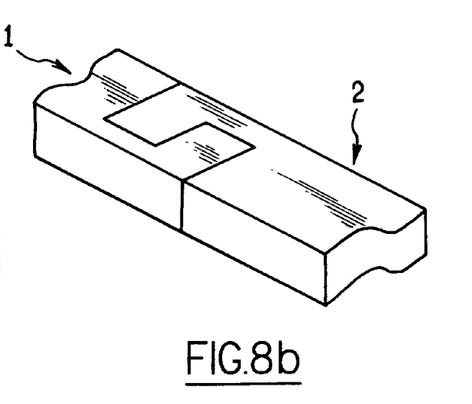

In addition, the projections and the cavities are formed either on the upper and lower surfaces (as illustrated in FIGS. 3 to 7) of the linking tabs, or on their lateral surfaces (as illustrated in FIGS. 8a and 8b.)

For example, when a cavity is formed in the upper face of one of the linking tabs 1 of a chain, the complementary projection is formed on the lower surface of the tab 2 to which it is to attach itself.

Finally, the height of the projection on tab 1, and the depth of the cavity in complementary tab 2 are preferably such that the assembly formed by the two tabs 1 and 2 when assembled has a thickness of the same order as that of the divisible bridging pieces 30 within the chains.

The cavity is preferably an orifice 7, 9 or a groove 3, 6 formed in the tab, such as a circular orifice, an orifice of square section, or a rectilinear, curved or angled channel, which extends transversally, longitudinally or obliquely on the tab, etc.

The associated projection is then formed, of complementary dimensions (width, length and height), so that they are suitable to interlock mutually and prevent any movement (in rotation or translation), such as a stud of round section, a stud of square section, a rectilinear, curved or angled rib, which lies in a manner that is complementary to its associated rib, etc.

When a tab includes several attachment elements (among the projections and the cavities), the latter can be aligned longitudinally, transversally or obliquely to the said tab without distinction.

It is preferable to choose the shape, the orientation and/or the combination of attachment elements (projections and cavities) so that the relative movements in translation and rotation of the interconnected chains are prevented.

This is particularly the case when an attachment element includes a stud 8, 10 and an orifice 7, 9 of circular section (the inside diameter of the orifice 7, 9 being equal to the outside diameter of the stud 8, 10.) The tabs 1 and 2 then also include at least one second attachment element, that is at least one second projection, and as many additional cavities. For example, a given tab includes two orifices 7 and 9, or a stud 10 and an orifice 9.

Thus, by interlocking of the studs 8, 10 in their complementary orifices 7 and 9, the two tabs 1 and 2 constitute an efficient means of interconnection and fixation, with the attachment elements forming at least two points of attachment between the two chains. Not only do they prevent any relative movement in translation (longitudinal and transverse motion), but they also prevent relative movement in rotation, by eliminating the symmetry of revolution of the means of attachment composed of the single attachment element made with a single stud and a single orifice.

Likewise, an attachment element made up by the association of a rib and a rectilinear channel, formed transversally (or longitudinally respectively) on the tabs 1, 2, does not have any cylindrical symmetry of revolution, and therefore prevents relative movements in rotation, but is not suitable to prevent transverse (and longitudinal respectively) movements in translation of the tabs. The said tabs 1, 2 are therefore equipped with at least one second attachment element whose shape and/or orientation prevents at least this movement in translation, such as an orifice and a stud of any section, in the second rib and channel and not parallel to the first rib and channel, etc.

Thus, it is possible, for example, to form the following on a tab 2:

a transverse or longitudinal curved or angled channel, a cavity of square section, centred in relation to the lateral sides of the tab, and formed in the upper face of the said tab (FIG. 6), two grooves, transverse, longitudinal or oblique, and substantially parallel or perpendicular, of identical or different shape, but complementary to the shape of the associated ribs and lying on the same width, a rectilinear channel, of variable depth, a channel whose lateral sides are not parallel to each other, etc.

The other tab 1 respectively then includes:

a transverse or longitudinal curved or angled rib, a projection of square section, centred in relation to the lateral sides of the tab, and formed in the lower surface of the said tab, two ribs, transverse, longitudinal or oblique, and substantially parallel or perpendicular, of identical or different shape, lying over all or part of the width of the tab, a rectilinear rib, of variable height and complementary to the depth of the channel, a rib whose lateral sides are not parallel to each other, etc.

A particular embodiment will now be described with reference to FIG. 7.

A first tab 2 includes a stud 4 and a transverse groove 6, of constant depth, created over the whole width of the tab 2, whose lateral sides are not necessarily parallel. They are positioned longitudinally on the tab 2.

The second tab 1 (not shown), which is complementary to tab 2, then includes a circular orifice, whose inside diameter is equal to the outside diameter of the stud 4, as well as a transverse rib that traverses the whole width of the tab 1. The height of the rib on the tab 1 is equal to the depth of the groove 6, and its lateral sides form between them the same angle as the lateral sides of the groove 6, so that they are complementary. The orifice and the rib are positioned longitudinally on the tab 1, and separated by the same distance as the stud and the rib of tab 2, so that the groove 6 and the stud can be assembled respectively with the rib and the orifice when tabs 1 and 2 are assembled.

In a variant, the stud 4 illustrated in FIG. 7 can be positioned in another part of the tab, such as at the bottom of the groove 6, on condition that the location of the complementary orifice is then adapted suitably.

Figure 4A:
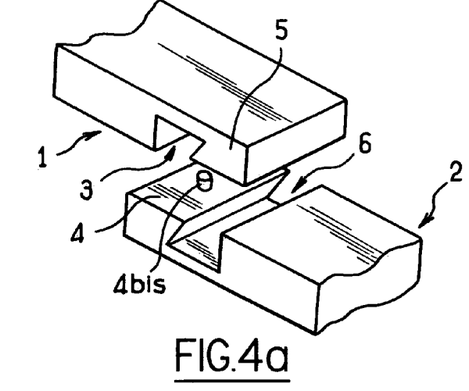
Figure 4B:
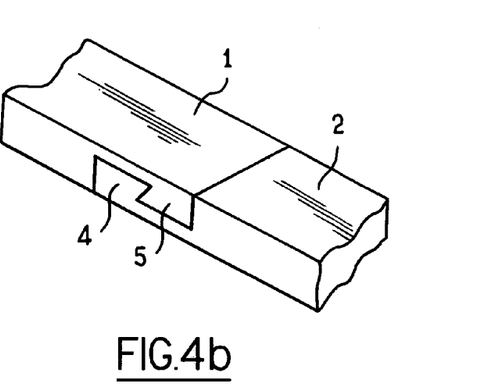
Figure 5:
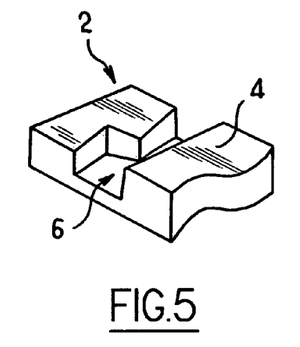
Figure 6:
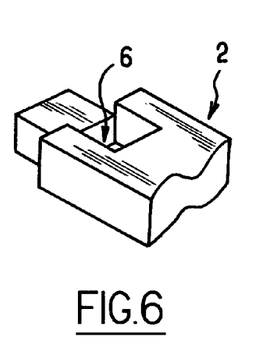

In a similar manner, FIG. 4*a* shows a stud 4*b* is on tab 2 that is intended, in association with a complementary cavity provided on the tab 1, to form a hard point after assembly, thereby limiting the risk of relative transverse movement of the two chains. Naturally, the positioning of this stud 4*b* is in FIG. 4*a* is not limiting.

The thickness of each tab 1, 2, the height and the depth of each element stud 4, groove 6, orifice and rib are such that the final thickness of the assembled linking device assemble is preferably of the order of magnitude of the height of a divisible bridging piece within the chain.

Someone skilled in the art will understand very well that such a mutual assembly prevents all relative movement in longitudinal and transversal translation and of rotation of the chains.

SECOND EMBODIMENT

According to a second embodiment, it is arranged to link the slider chains (integrally or as a complement to the aforementioned tabs of complementary shape) by overmoulding the ends of the chains, with the said overmoulding being effected so that the thickness of the overmoulded zones is the same or of the same order of magnitude as the thickness of the divisible bridging pieces 30 within the chains.

Naturally, the present invention is not limited to the particular embodiments just described, but extends to any variant that conforms to its spirit.

In the context of the present invention, the closure strips can be presented in any appropriate known form, such as in the form of spools or in bulk.

The invention claimed is:

1. Slider chain including a plurality of sliders joined together by divisible bridging pieces, said slider chain including a linking device at each end respectively to interconnect the ends of two slider chains in order to form a longer chain overall, characterised in that the linking devices include attachment means comprising a single attachment element including a projection and a cavity which are not of cylindrical revolution to prevent any relative movement in rotation, in longitudinal translation and transverse translation of the slider chains when they are interconnected.

2. The chain according to claim 1, characterised in that total thickness of the attachment means, when the ends of the two sliders are assembled, is substantially equal to the thickness of the divisible bridging pieces within a chain.

3. The chain according to claim 1, characterised in that the attachment means are divisible.

4. The chain according to claim 1, characterised in that the chain includes two tabs of complementary shape respectively at its ends.

5. The chain according to claim 1, characterised in that a projection is formed at one of the ends, and that it is complementary to a cavity, formed at the other end.

6. The chain according to claim 5, characterised in that the projection and the associated cavity are of complementary shape and dimensions, so that they are suitable to mutually interlock.

7. The chain according to claim 1, characterised includes a means of attachment with a projection chosen from the following group:

a stud of round section,
a stud of square section,
a rectilinear rib,
a curved rib,
an angled rib,
and a complementary cavity chosen from the following group:
a circular orifice,
an orifice of square section,
a rectilinear channel,
a curved channel,
an angled channel.

8. The chain according to claim 1, characterised in that the chain is created by injection moulding in a plastic material, in particular of the polyoxymethylene or polyolefins type, such as high and low density polyethylene or polypropylene.

9. A collection of slider chains, in the form of a spool, characterised in that the spool includes a plurality of slider chains that are connected together using attachment means according to claim 1.

* * * * *

UNITED STATES PATENT AND TRADEMARK OFFICE
CERTIFICATE OF CORRECTION

PATENT NO. : 7,673,441 B2  
APPLICATION NO. : 12/214674  
DATED : March 9, 2010  
INVENTOR(S) : Roger et al.

Page 1 of 3

It is certified that error appears in the above-identified patent and that said Letters Patent is hereby corrected as shown below:

On The Title Page  
Item (57), under Abstract, delete "4 drawing sheets", insert -- 3 drawing sheets -- See attached sheet In the Header, delete "Sheet 1 of 4", insert -- Sheet 1 of 3 --

Delete Drawing Sheet of Fig. 2

In the Header, delete "Sheet 3 of 4", insert -- Sheet 2 of 3 --

Figure 3:
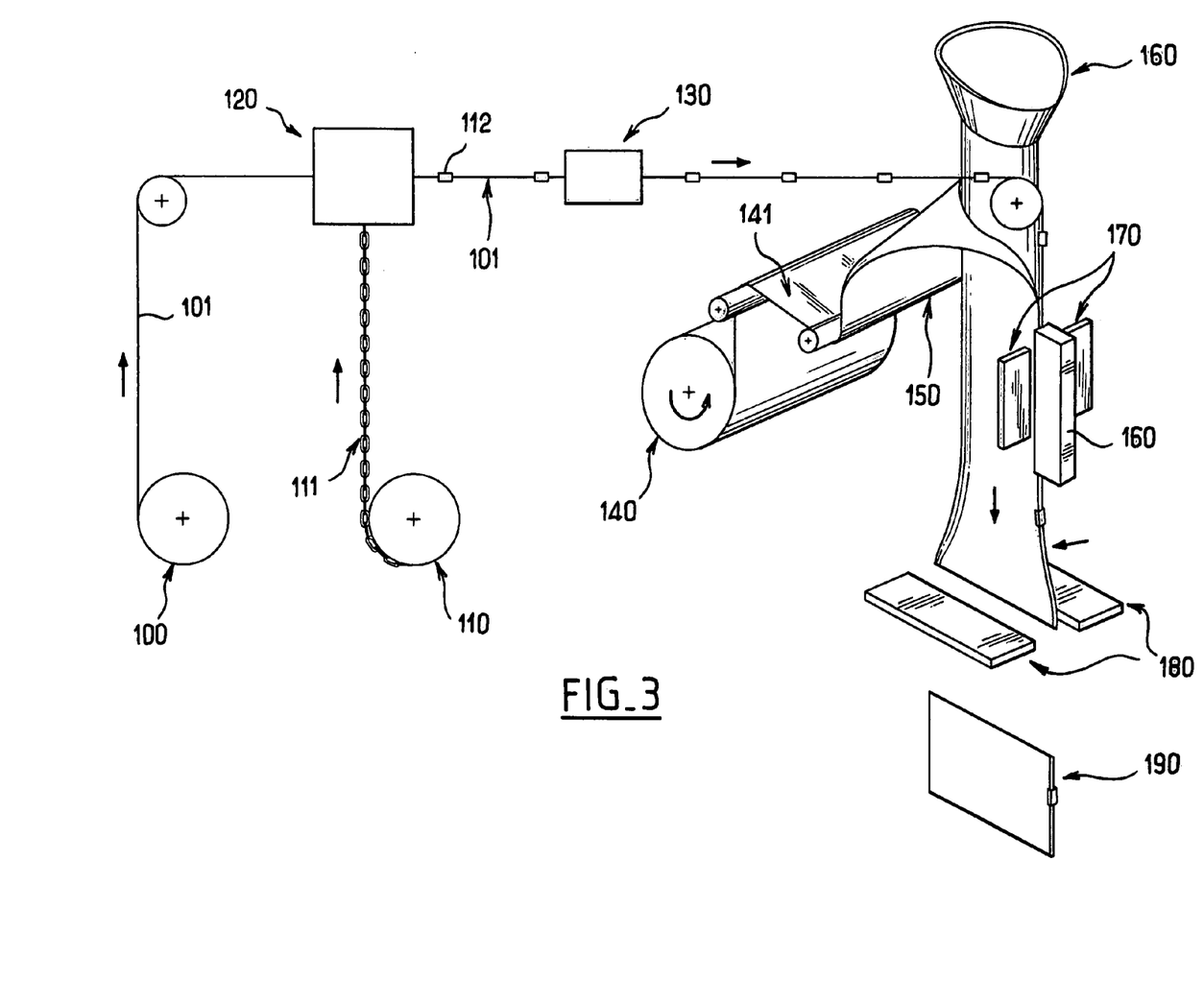
FIGS. 3 to 8 illustrate, in elevation, embodiments of two complementary linking tabs of a slider chain according to the invention.
Figure 3A:
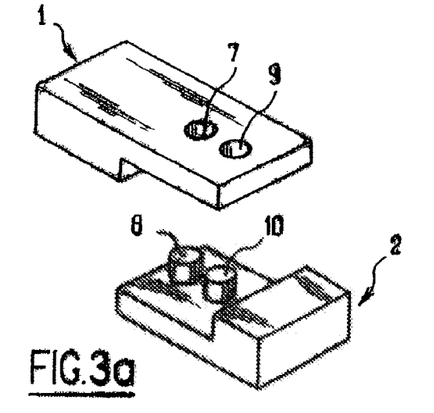
Figures 3A, 3B, 3C:
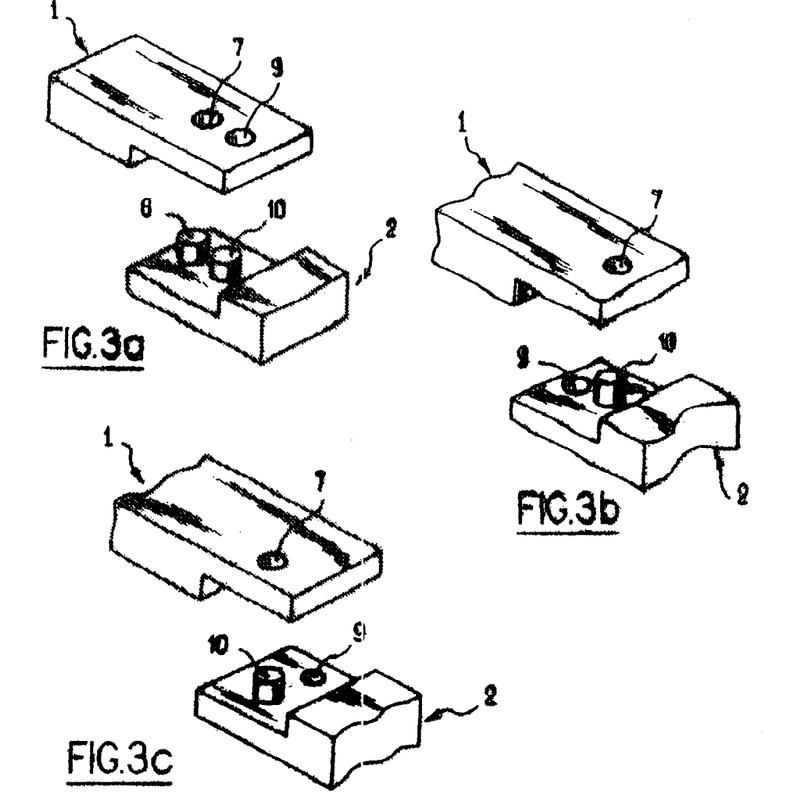
Figure 3B:
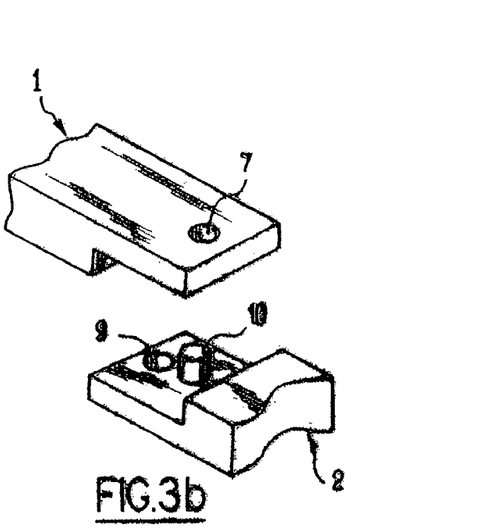
Figure 3C:
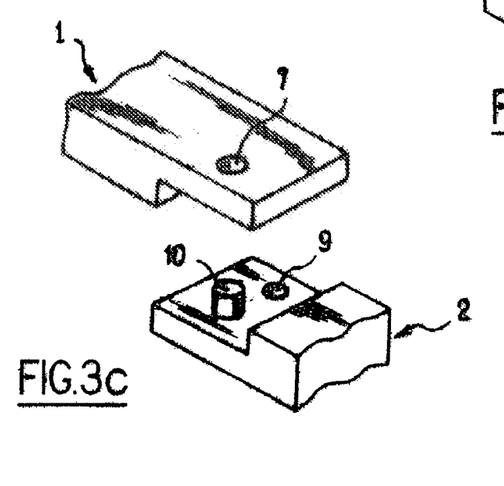

Under the drawing, delete "Fig. 3", insert -- Fig. 2 -- See attached

In the Header, delete "Sheet 4 of 4", insert -- Sheet 3 of 3 --

Column 5, line 41, delete "4*b* is", insert -- 4bis --

Column 5, line 45, delete "4*b* is", insert -- 4bis --

Signed and Sealed this  
Twentieth Day of December, 2011

David J. Kappos  
*Director of the United States Patent and Trademark Office*

CERTIFICATE OF CORRECTION (continued)

(12) United States Patent
Roger et al.

(10) Patent No.: US 7,673,441 B2
(45) Date of Patent: Mar. 9, 2010

(54) SLIDER CHAINS

(75) Inventors: Antony Roger, Sartrouville (FR);
Michel Barreaux, Henonville (FR)

(73) Assignee: S2F Flexico, Henonville (FR)

( * ) Notice: Subject to any disclaimer, the term of this patent is extended or adjusted under 35 U.S.C. 154(b) by 0 days.

(21) Appl. No.: 12/214,674

(22) Filed: Jun. 19, 2008

(65) Prior Publication Data

US 2009/0031694 A1  Feb. 5, 2009

(30) Foreign Application Priority Data

Jun. 21, 2007  (FR) ............................... 07 55918

(51) Int. Cl.
*F16G 15/12* (2006.01)
*A44C 5/02* (2006.01)

(52) U.S. Cl. ...................... 59/85; 59/79.1; 59/80; 59/93; 59/900; 24/415

(58) Field of Classification Search ............ 59/79.1, 59/80, 85, 93, 900; 24/415
See application file for complete search history.

(56) References Cited

U.S. PATENT DOCUMENTS

| | | | | |
|---|---|---|---|---|
| 2,791,868 A | * | 5/1957 | Viken | 59/80 |
| 3,845,618 A | * | 11/1974 | Meyerson | 59/80 |
| 4,770,008 A | * | 9/1988 | Yamaura | 59/900 |
| 6,782,690 B2 | * | 8/2004 | Kwan | 59/79.1 |

* cited by examiner

*Primary Examiner*—David B Jones
(74) *Attorney, Agent, or Firm*—Blakely, Sokoloff, Taylor & Zafman (57) ABSTRACT

A slider chain including a plurality of sliders joined together by divisible bridging pieces (30), and including a linking device at each end in order to interconnect the ends of two slider chains so as to form a longer chain overall. The sliders include an attachment mechanism which is not of cylindrical revolution.

9 Claims, 3 Drawing Sheets

FIG_2

UNITED STATES PATENT AND TRADEMARK OFFICE
CERTIFICATE OF CORRECTION

| | | |
|---|---|---|
| PATENT NO. | : 7,673,441 B2 | Page 1 of 5 |
| APPLICATION NO. | : 12/214674 | |
| DATED | : March 9, 2010 | |
| INVENTOR(S) | : Roger et al. | |

It is certified that error appears in the above-identified patent and that said Letters Patent is hereby corrected as shown below:

Delete the title page and substitute therefore the attached title page showing the corrected number of drawing sheets in patent.

Delete Drawing Sheets 1-4 and substitute therefore the attached Drawing Sheets 1-3. Drawing Sheet of FIG 2 has been deleted.

Column 5, line 41, delete "4*b* is", insert -- 4bis --

Column 5, line 45, delete "4*b* is", insert -- 4bis --

This certificate supersedes the Certificate of Correction issued December 20, 2011.

Signed and Sealed this
Tenth Day of January, 2012

David J. Kappos
*Director of the United States Patent and Trademark Office*

(12) United States Patent
Roger et al.

(10) Patent No.: US 7,673,441 B2
(45) Date of Patent: Mar. 9, 2010

(54) SLIDER CHAINS (75) Inventors: Antony Roger, Sartrouville (FR); Michel Barreaux, Henonville (FR)

(73) Assignee: S2F Flexico, Henonville (FR)

( * ) Notice: Subject to any disclaimer, the term of this patent is extended or adjusted under 35 U.S.C. 154(b) by 0 days.

(21) Appl. No.: 12/214,674

(22) Filed: Jun. 19, 2008

(65) Prior Publication Data
US 2009/0031694 A1 Feb. 5, 2009

(30) Foreign Application Priority Data
Jun. 21, 2007 (FR) .................... 07 55918

(51) Int. Cl.
*F16G 15/12* (2006.01)
*A44C 5/02* (2006.01)

(52) U.S. Cl. .................. 59/85; 59/79.1; 59/80; 59/93; 59/900; 24/415

(58) Field of Classification Search ............... 59/79.1, 59/80, 85, 93, 900; 24/415
See application file for complete search history.

(56) References Cited
U.S. PATENT DOCUMENTS

| | | | | |
|---|---|---|---|---|
| 2,791,868 A | * | 5/1957 | Viken | 59/80 |
| 3,845,618 A | * | 11/1974 | Meyerson | 59/80 |
| 4,770,008 A | * | 9/1988 | Yamaura | 59/900 |
| 6,782,690 B2 | * | 8/2004 | Kwan | 59/79.1 |

* cited by examiner

*Primary Examiner*— David B Jones
(74) *Attorney, Agent, or Firm*—Blakely, Sokoloff, Taylor & Zafman (57) ABSTRACT

A slider chain including a plurality of sliders joined together by divisible bridging pieces (30), and including a linking device at each end in order to interconnect the ends of two slider chains so as to form a longer chain overall. The sliders include an attachment mechanism which is not of cylindrical revolution.

9 Claims, 3 Drawing Sheets